United States Patent
Yoshida

(10) Patent No.: US 9,683,661 B2
(45) Date of Patent: Jun. 20, 2017

(54) CONTROLLER AND SHIFT-BY-WIRE SYSTEM USING THE CONTROLLER

(71) Applicant: DENSO CORPORATION, Kariya, Aichi-pref. (JP)

(72) Inventor: Kazuhiro Yoshida, Tokoname (JP)

(73) Assignee: DENSO CORPORATION, Kariya (JP)

( * ) Notice: Subject to any disclaimer, the term of this patent is extended or adjusted under 35 U.S.C. 154(b) by 42 days.

(21) Appl. No.: 14/805,724

(22) Filed: Jul. 22, 2015

(65) Prior Publication Data
US 2016/0025214 A1 Jan. 28, 2016

(30) Foreign Application Priority Data
Jul. 23, 2014 (JP) .................. 2014-149716

(51) Int. Cl.
| | | |
|---|---|---|
| B60R 22/00 | (2006.01) | |
| E05F 15/00 | (2015.01) | |
| G05D 1/00 | (2006.01) | |
| G05D 3/00 | (2006.01) | |
| G06F 17/00 | (2006.01) | |
| G06F 7/00 | (2006.01) | |
| F16H 63/48 | (2006.01) | |
| F16H 61/32 | (2006.01) | |

(52) U.S. Cl.
CPC ....... *F16H 63/48* (2013.01); *F16H 2061/326* (2013.01)

(58) Field of Classification Search
CPC ............................ F16H 2061/326; F16H 63/48
USPC ............................................................ 701/45
See application file for complete search history.

(56) References Cited

U.S. PATENT DOCUMENTS

| | | | | |
|---|---|---|---|---|
| 6,527,076 B1* | 3/2003 | Polzin | ................... | B60K 31/00 180/170 |
| 2001/0027368 A1* | 10/2001 | Minowa | ............ | B60W 30/1819 701/70 |
| 2004/0209718 A1* | 10/2004 | Ishibashi | ............. | B60W 10/103 474/18 |
| 2005/0151492 A1 | 7/2005 | Nakai et al. | | |
| 2006/0006827 A1 | 1/2006 | Nakai et al. | | |
| 2008/0035444 A1* | 2/2008 | Schiele | ............... | F16H 61/0059 192/219.5 |
| 2009/0029826 A1* | 1/2009 | Eguchi | ..................... | B60T 7/02 477/39 |

(Continued)

FOREIGN PATENT DOCUMENTS

| | | |
|---|---|---|
| JP | 2002-295657 | 10/2002 |
| JP | 2005-247193 | 9/2005 |

(Continued)

*Primary Examiner* — Harry Oh
(74) *Attorney, Agent, or Firm* — Nixon & Vanderhye P.C.

(57) ABSTRACT

A shift-by-wire system, including a controller that includes a motor driver, and a microcomputer connected to the motor driver to control a motor that drives a control object. The control object has a park lock mechanism having a lock state and an unlock state. The lock state and the unlock state are switched according to an operation position of the control object. The controller is configured to estimate a tilt of a vehicle, detect whether the lock mechanism is in the lock state or in the unlock state, and adjust a target rotation speed of the motor according to the estimated tilt when the operation position of the control object is changed for switching the lock state to the unlock state.

3 Claims, 7 Drawing Sheets

(56) References Cited

U.S. PATENT DOCUMENTS

| | | | | |
|---|---|---|---|---|
| 2009/0043465 A1* | 2/2009 | Tomita | ................... | B60K 6/40 |
| | | | | 701/51 |
| 2010/0250055 A1* | 9/2010 | Ito | ..................... | F16H 61/12 |
| | | | | 701/29.2 |

FOREIGN PATENT DOCUMENTS

| JP | 2006-306273 | 11/2006 |
|---|---|---|
| JP | 2013-187966 | 9/2013 |
| JP | 2013-194750 | 9/2013 |

* cited by examiner

CONTROLLER AND SHIFT-BY-WIRE SYSTEM USING THE CONTROLLER

CROSS REFERENCE TO RELATED APPLICATION

The present application is based on and claims the benefit of priority of Japanese Patent Application No. 2014-149716, filed on Jul. 23, 2014, the disclosure of which is incorporated herein by reference.

TECHNICAL FIELD

The present disclosure generally relates to a controller and a shift-by-wire system using the controller.

BACKGROUND INFORMATION

Conventionally, in a field of the vehicle controller, an X-by-wire system is well known, in which an actuator is controlled with a by-wire circuit under control of a driver's instruction for adjusting and changing a vehicle state, and, among which a shift-by-wire system is a representative one. For example, a Japanese patent document 1, i.e., JP 2004-129452 A, discloses a shift-by-wire system in which a phase advance amount of a power supply phase relative to a rotation phase of a rotor is set for a motor control according to a rotation speed of the rotor.

(Patent document 1) Japanese Patent Laid-Open No. 2004-129452

In the shift-by-wire system for switching the shift position with a by-wire system, the shift position is more quickly switched than a manual shift switching operation of the driver, for example. However, as a trade-off, at a time of releasing a lock state of a lock mechanism, which is caused by the switching of the shift position into the parking position, the shift-by-wire system may generate a large noise. In the above-described patent document 1, no consideration is provided for preventing such a noise at a lock release time.

SUMMARY

It is an object of the present disclosure to provide a controller and a shift-by-wire system that are capable of reducing a noise at a lock release time of a lock mechanism.

In an aspect of the present disclosure, a controller includes a motor driver, and a microcomputer connected to the motor driver to control a motor that drives a control object. The control object has a park lock mechanism having a lock state and an unlock state. The lock state and the unlock state are switched according to an operation position of the control object. The controller is configured to estimate a tilt of a vehicle, detect whether the lock mechanism is in the lock state or in the unlock state; and adjust a target rotation speed of the motor according to the estimated tilt when the operation position of the control object is changed for switching the lock state to the unlock state.

In such manner, according to a state of engagement of the lock mechanism which may be different depending on the tilt of the vehicle, the target rotation speed of the motor is variably changed for suitably unlocking the lock state at an appropriate (unlocking) speed, thereby reducing the noise at the lock release time. For example, when the vehicle is in a backward sliding state (i.e., on a slope), the target rotation speed of the motor may be changed to a smaller value in comparison to a level state of the vehicle, the noise at the lock release time may be reduced.

Further, the controller of the present disclosure is suitably adapted to a shift-by-wire system. The shift-by-wire system may include a controller, a motor, a shift position switching device and a lock mechanism. The motor is driven under control of the controller. The shift position switching device includes a control object, an operation of which is controlled for a switching of the shift position. The lock mechanism is put in a lock state when the shift position is switched into the parking position, and is put in an unlock state when the shift position is switched into a non-parking position.

In the present disclosure, the target rotation speed of the motor is switchable according to the tile of the vehicle, thereby enabling a reduction of the noise at the lock release time.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, one embodiment of the present disclosure is described based on the drawings.

One Embodiment

The control device in one embodiment of the present disclosure and the shift by wire system using the same are shown in FIGS. 1 to 7.

Figure 1:
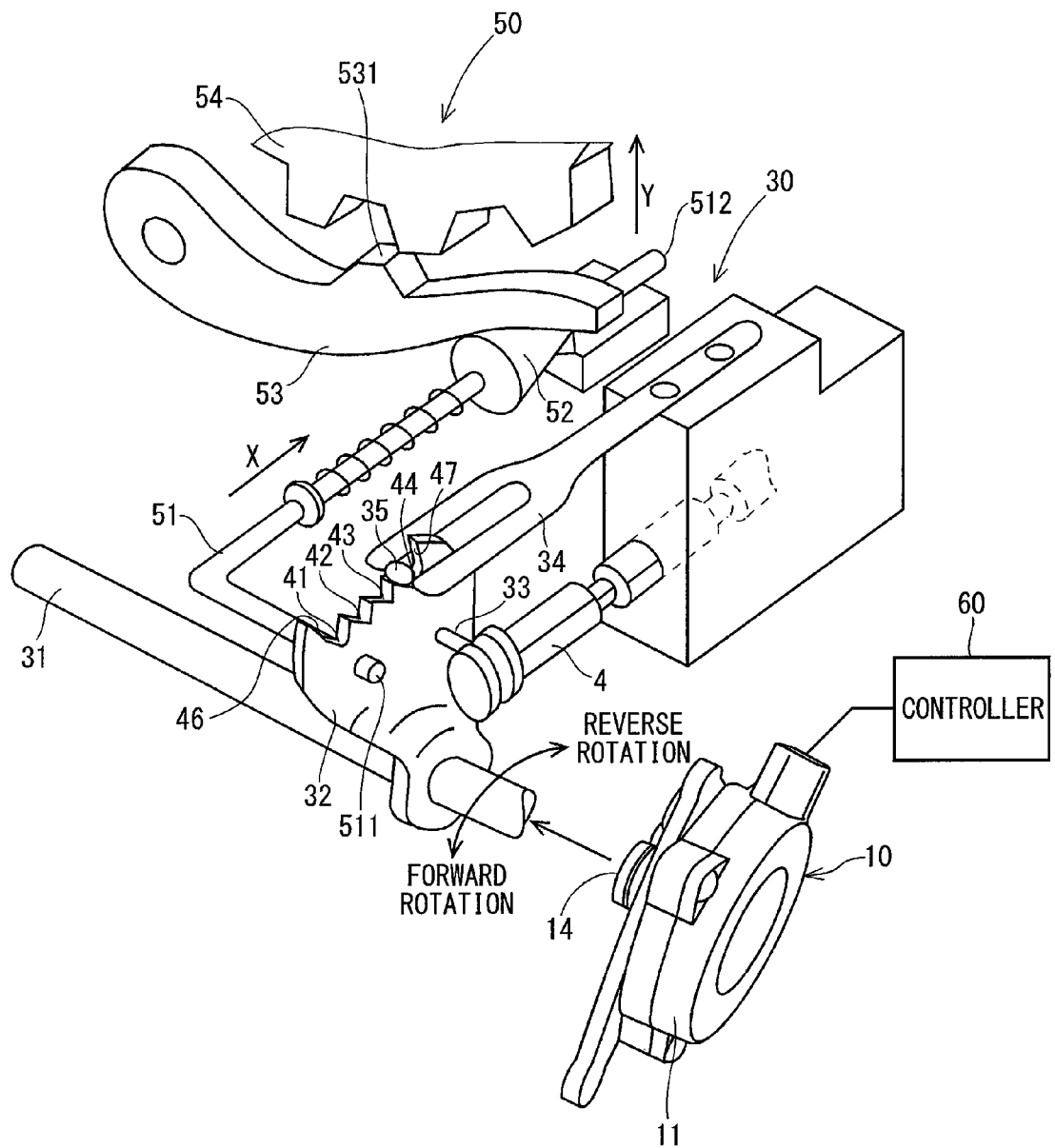
FIG. 1 is a perspective view of a controller and a shift-by-wire system using the controller in one embodiment of the present disclosure.
Figure 2:
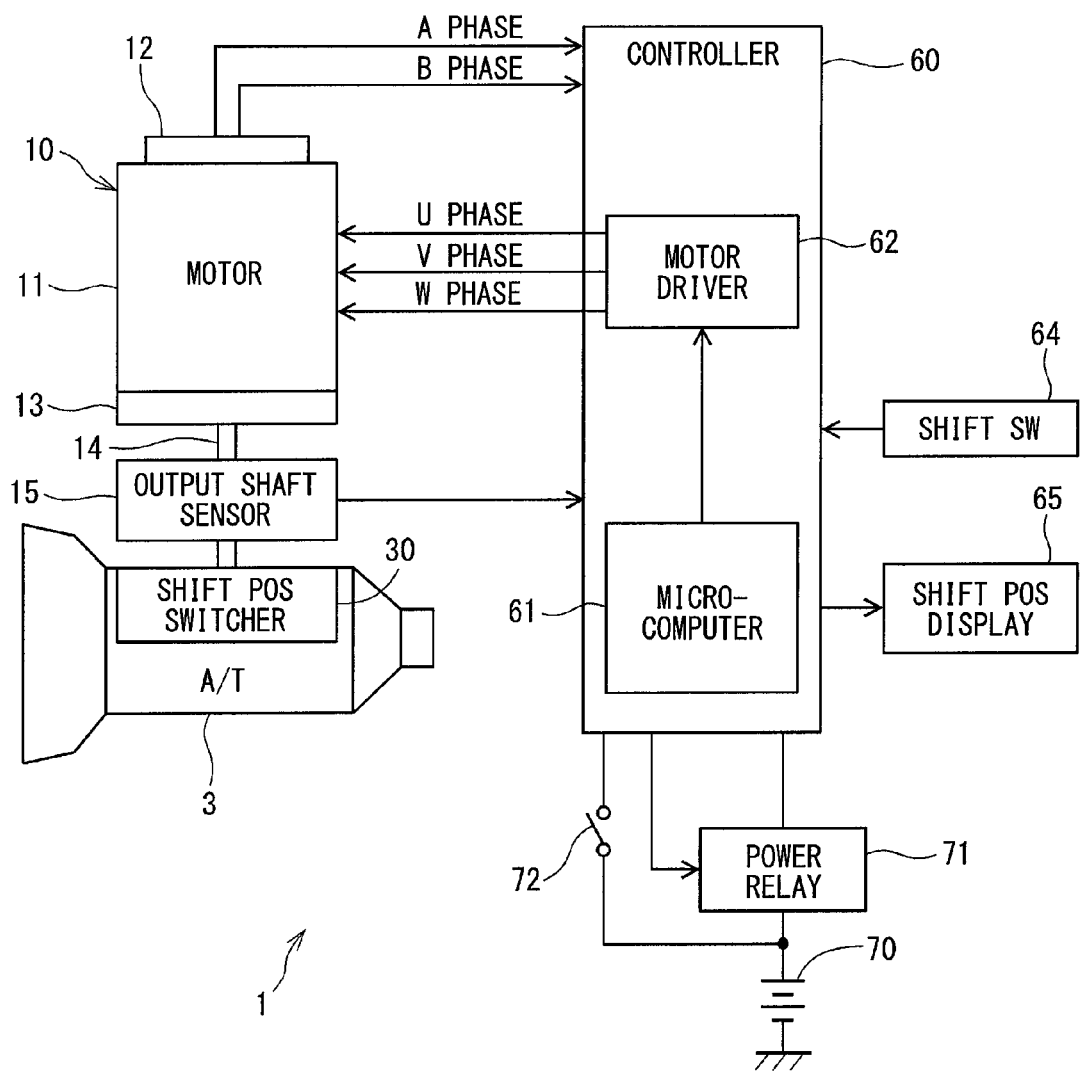
FIG. 2 is a block diagram of the controller and the shift-by-wire system using the controller in the one embodiment of the present disclosure.

As shown in FIGS. 1 and 2, a shift-by-wire system 1 is provided with an actuator 10, a shift position switcher 30, a park lock mechanism 50, and a controller 60 and the like. The shift-by-wire system 1 is, for example, installed in a vehicle 90 (refer to FIG. 4.), together with an automatic transmission (A/T) 3, and switches or shifts the shift range (e.g., a gear shift position, or a shift position) of the automatic transmission 3 by a by-wire control of the shift position switcher 30 based on a drive of the actuator 10 according to driver's instructions.

The actuator 10 has a motor 11, an encoder 12, a speed reduction gear 13, and an output shaft 14 together with other parts.

The motor 11 rotates by receiving a supply of an electric power from a battery 70 carried in the vehicle 90, and functions as a source of a drive power of the shift position switcher 30. The motor 11 may be a switched-reluctance (SR) motor. A stator and a rotor in the SR motor 11 have a salient pole structure, which enables a relatively simple structure by omitting the permanent magnet.

The encoder 12 detects a rotation angle (i.e., a rotation position) of the rotor. The encoder 12 is a rotary encoder of a magnetic type, for example, and is constituted by a magnet which rotates with the rotor and a Hall IC for detecting magnetism etc. The encoder 12 outputs a pulse signal of an A phase and a B phase at a given specific angle synchronizing with the rotation of the rotor.

The speed reduction gear 13 slows down the rotation of the shaft of the motor 11, outputs the rotation from the output shaft 14, and transmits the rotation to the shift position switcher 30. An output shaft sensor 15 that detects the rotation angle of the output shaft 14 is disposed on the output shaft 14. By detecting the rotation angle of the output shaft 14, "an operation position of a controlled object" is detectable.

As shown in FIG. 1, the shift position switcher 30 has a manual shaft 31, a detent plate 32, and a detent spring 34 together with other parts, and transmits the rotational drive power outputted from the speed reduction gear 13 to a manual valve 4 and the park lock mechanism 50.

The manual shaft 31 is connected to the output shaft 14 of the actuator 10, and is rotated with the rotational drive power of the motor 11.

The detent plate 32 extends outward from the manual shaft 31, and is constituted in one body with the manual shaft 31. In such structure, the detent plate 32 is driven by the actuator 10 together with the manual shaft 31. According to the present embodiment, the detent plate 32 is equivalent to a "controlled object" in the claims, and the position of the detent plate 32 is equivalent to an "operation position of a controlled object."

A pin 33 which projects in parallel with the manual shaft 31 is disposed on the detent plate 32. The pin 33 is connected to the manual valve 4. Therefore, according to a move of the detent plate 32 together with the manual shaft 31, the manual valve 4 reciprocally moves along its axial direction. Namely, the shift position switcher 30 converts a rotational movement of the actuator 10 into a straight (i.e., linear) motion, and transmits it to the manual valve 4.

As for the detent plate 32, concavities 41 to 44 are formed at radial-outside positions of the manual shaft 31. The concavity 41 is formed on one end side of the detent plate 32, i.e., at one dead-end of its rotational movement. The concavity 44 is formed on the other end side of the detent plate 32. Between the concavity 41 and the concavity 44, the concavity 42 is positioned on one side close to the concavity 41, and the concavity 43 is positioned close to the concavity 44.

Figure 6:
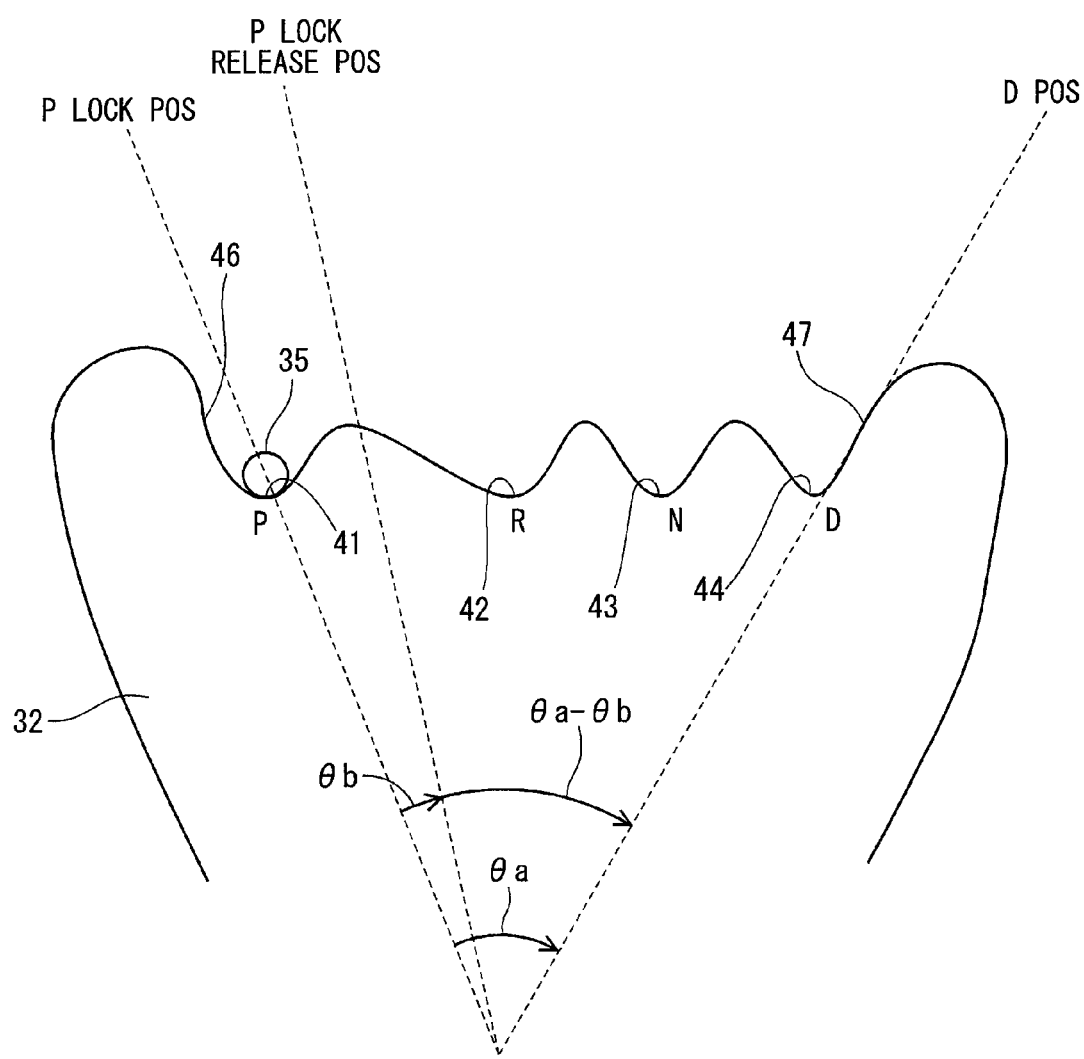
FIG. 6 is an illustration of how to set a threshold for a slow speed range in the one embodiment of the present disclosure.

According to the present embodiment, the concavity 41 is equivalent to a "P range" of the automatic transmission 3 among four shift positions or ranges, the concavity 42 is equivalent to an "R range," the concavity 43 is equivalent to an "N range," and the concavity 44 is equivalent to a "D range." Further, a sidewall of the concavity 41 away from the concavity 42 is a P range wall 46, and a sidewall of the concavity 44 away from the concavity 43 is a D range wall 47 (refer also to FIG. 6).

The detent spring 34 is a tabular member which is elastically deformable, and has, at its tip, a detent roller 35 which regulates the movement of the detent plate 32. The detent spring 34 biases the detent roller 35 toward a rotation center of the detent plate 32 (i.e., toward the manual shaft 31).

When the detent plate 32 is rotated by a force greater than a certain threshold, an elastic deformation of the detent spring 34 is caused the detent roller 35 rolls over a convex between each of the concavities 41 to 44 to roll down to the adjacent concavity.

By such roll down of the detent roller 35 into one of the concavities 41 to 44, the move of the detent plate 32 is regulated, and a position of the manual valve 4 along its axial direction and a state of the park lock mechanism 50 are respectively determined. Thereby, the shift range of the automatic transmission 3 is fixed. Further, the detent plate 32 and the detent roller 35 function as a so-called a "detent."

In the present embodiment, when a shift range switches from the "P range" to the "R range," the "N range," and to the "D range," a rotation direction of the output shaft 14 is defined as a "forward rotation." When a shift range switches from the "D range" to the "N range," the "R range," and to the "P range," the rotation direction of the output shaft 14 is defined as a "reverse rotation."

The park lock mechanism 50 comprises a parking rod 51, a cone 52, a parking lock pole 53, and a parking gear 54.

The parking rod 51 takes an L shape, and one end 511 of the parking rod 51 is fixed to the detent plate 32. The other end 512 of the parking rod 51 has the cone 52 attached thereto.

If the motor 11 provides the reverse rotation to the manual shaft 31, the parking rod 51 moves along a direction shown by an arrow X in FIG. 1 together with the detent plate 32.

If the motor 11 provides the forward rotation to the manual shaft 31, the parking rod 51 also reversely moves along the arrow X direction in FIG. 1, i.e., moves away from the parking lock pole 53 in this case together with the detent plate 32.

Here, in the present embodiment, a move direction of the parking rod 51 when the motor 11 provides the forward rotation is defined as a "lock release direction", and another move direction of the parking rod 51 when the motor 11 provides the reverse rotation is defined as a "lock direction," which is an arrow X direction in FIG. 1.

The cone 52 takes a tapered shape whose diameter is reduced toward the tip thereof, i.e., toward the other end 512.

The parking lock pole 53 contacts a tapered surface of the cone 52, and is movably disposed. The parking lock pole 53 has a convex 531 which is engageable with the parking gear 54.

The parking gear 54 is disposed on an axle which is not illustrated, and is disposed engageably with the parking lock pole 53. When the parking gear 54 engages the parking lock pole 53, rotation of the axle is restricted.

Switching between a lock state and an unlock state of the park lock mechanism 50 is described later.

As shown in FIG. 2, the controller 60 is provided with a microcomputer 61, a motor driver 62, and the like.

The microcomputer 61 counts a rising edge and a falling edge of an A phase signal and a B phase signal which are output from the encoder 12, and drives the rotation of the motor 11 based on the count value of those edges (encoder counted Ne) by switching the power supply phase of the motor 11 to an appropriate one in order with the motor driver 62. The motor driver 62 outputs a drive signal for supplying power to each of the U, V, W phases of the motor 11.

The controller 60 receives electric power from the battery 70 via a power relay 71 in the vehicle 90. When an ignition switch 72 is switched to ON, the power relay 71 is turned ON, and the electric power is supplied to the controller 60.

When the ignition switch 72 is switched to OFF, the power relay 71 is turned OFF, and a supply of the electric power to the controller 60 stops.

The encoder 12 of the present embodiment is an incremental type encoder. The controller 60 either counts up or counts down the encoder count Ne according to the pulse signal output from the encoder 12. In the present embodiment, the encoder count Ne counts up at the time of forward rotation (i.e., rotation from P range to D range), and the encoder count Ne counts down at the time of reverse rotation (i.e., rotation from D range to P range). Thereby, the controller 60 detects the rotation state of the motor 11, and can rotate the motor 11 at high speed without causing asynchronous rotation. Further, every time the shift-by-wire system 1 is started, an initial drive control is performed for a synchronous drive of the encoder count Ne and the power supply phase, i.e., for determining and learning an excitation power supply phase.

The reference position corresponding to an absolute rotation position of the motor 11 is learned in order for switching a shift range to a desired one by the rotation of the motor 11, for the matching of such a reference position and a limit position of a movable range of the detent plate 32. More practically, for the learning of the reference position, the motor 11 is rotated until the detent plate 32 stops at the limit position of the movable range, with a limited amount of power supply for the motor 11.

During the learning of the reference position, the motor 11 is rotated to cause the sidewall of either the concavity 41 or the concavity 44 to abut on the detent roller 35. Therefore, such a rotation of the motor 11 may be considered as a "wall abutment learn control" or an "abutment learning control."

The controller 60 receives a signal from the shift switch 64 that is operated by the driver. The signal from the shift switch 64 represents a shift position, i.e., an operation position of a shift lever. Then, the controller 60 determines a target range based on the signal from shift switch 64, the signal from a brake, the signal from a speed sensor, etc.

Then, the controller 60 controls the rotation of the actuator 10 so that the shift range of the automatic transmission 3 is controlled to a target range. That is, a shift range is switched to a target range by rotating the motor 11 to a target rotation position corresponding to the target range represented by the signal from the shift switch. Thereby, the actual range of the automatic transmission 3 is switched to the desired range which is intended by the driver. The shift range after the switching of the shift range is displayed on a shift position display 65 provided on an instrument panel which is not illustrated.

Here, the switching between a lock state and an unlock state of the park lock mechanism 50 is described.

FIG. 1 shows a shift range being put in a "D range." When a shift range is in one of other-than-P ranges (i.e., a "non-P range") which is a range other than "P range", the parking gear 54 is not locked by the parking lock pole 53. Therefore, rotation of an axle is not prohibited by the park lock mechanism 50.

Starting from such a state, if the output shaft 14 rotates in a reverse rotation, the parking rod 51 moves in the lock direction (i.e., an arrow X direction in FIG. 1) with the rotation of the detent plate 32, the parking lock pole 53 is pushed up along a Y direction in FIG. 1 to engage the parking gear 54. When the detent plate 32 is driven to the position at which the detent roller 35 fits into the concavity 41, the convex 531 of the parking lock pole 53 engages with the parking gear 54, and the parking gear 54 is locked. When the parking gear 54 is locked, rotation of an axle is restricted.

Further, starting from a state in which the parking gear 54 is locked, when the output shaft 14 rotates forward, the parking rod 51 moves in the lock release direction (i.e., reversely relative to the arrow X direction in FIG. 1) with the rotation of the detent plate 32, and the parking lock pole 53 moves away from the parking gear 54, i.e., in a reverse direction of the Y direction in FIG. 1. When the detent plate 32 is driven to a position where the detent roller 35 slips out of the concavity 41, the convex 531 of the parking lock pole 53 separates from the parking gear 54, and realizes the unlock state.

Namely, when the shift range is in the "P range", the "lock state" is realized by the engagement of the parking lock pole 53 and the parking gear 54, and when the shift range is in the "non-P range", the "unlock state" is realized in which the parking lock pole 53 and the parking gear 54 do not engage with each other.

Figure 3A:
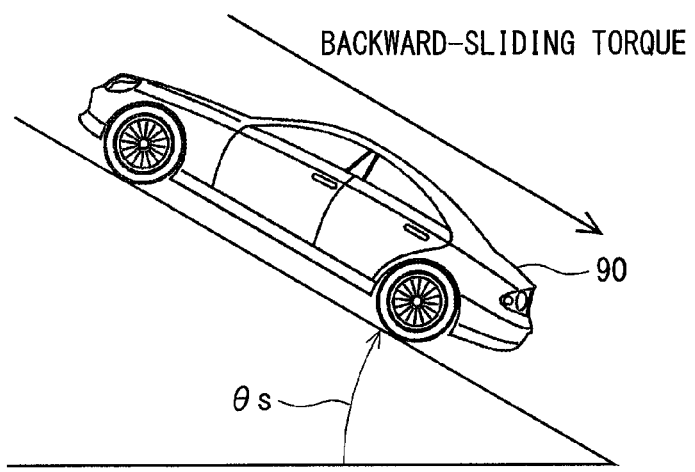
FIGS. 3A/B/C are illustrations of a backward sliding state of a vehicle in the one embodiment of the present disclosure.
Figure 3B:
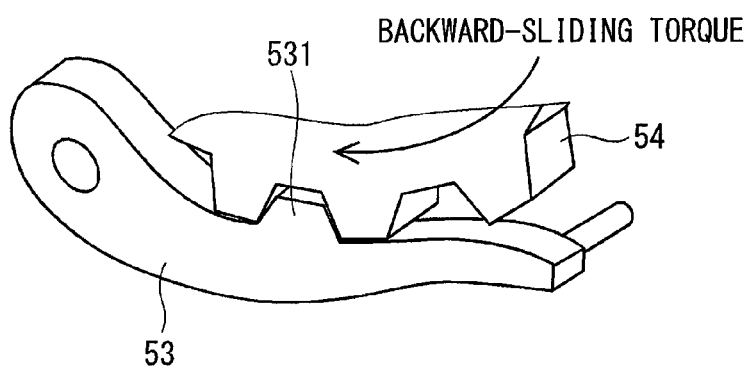
Figure 3C:
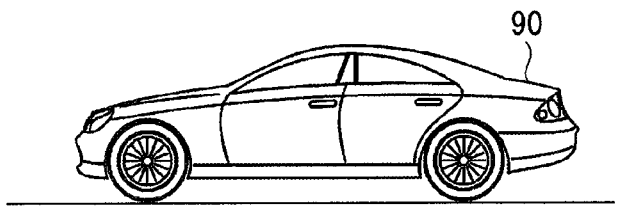

When the park lock mechanism 50 is in the lock state, if the vehicle 90 is stopping on a slope as shown in FIG. 3A, the parking gear 54 connected to an axle receives a backward sliding torque as shown in FIG. 3B. Therefore, in comparison to a lock state in FIG. 3C in which the vehicle 90 is stopping on a level surface, the lock state of the park lock mechanism 50 in FIG. 3B is realized as the state in which the engagement of the convex 531 of the parking lock pole 53 and the parking gear 54 is stronger.

Here, when the lock state of the park lock mechanism 50 is released at high speed as usual, a large gear noise will be generated because the friction speed between the parking lock pole 53 and the parking gear 54 is large.

Further, even though the illustration in FIG. 3A shows a backward sliding situation, the same consideration applies to a forward sliding situation in which the vehicle 90 is stopping on a forward descending slope to suffer from a forward sliding torque.

Therefore, in the present embodiment, according to the tilt state of the vehicle 90, i.e., when the vehicle 90 is stopping on a slope, by rotating the motor 11 more slowly, the torque between the parking lock pole 53 and the parking gear 54 may be more slowly released for the switching from the lock state to the unlock state.

Figure 4:
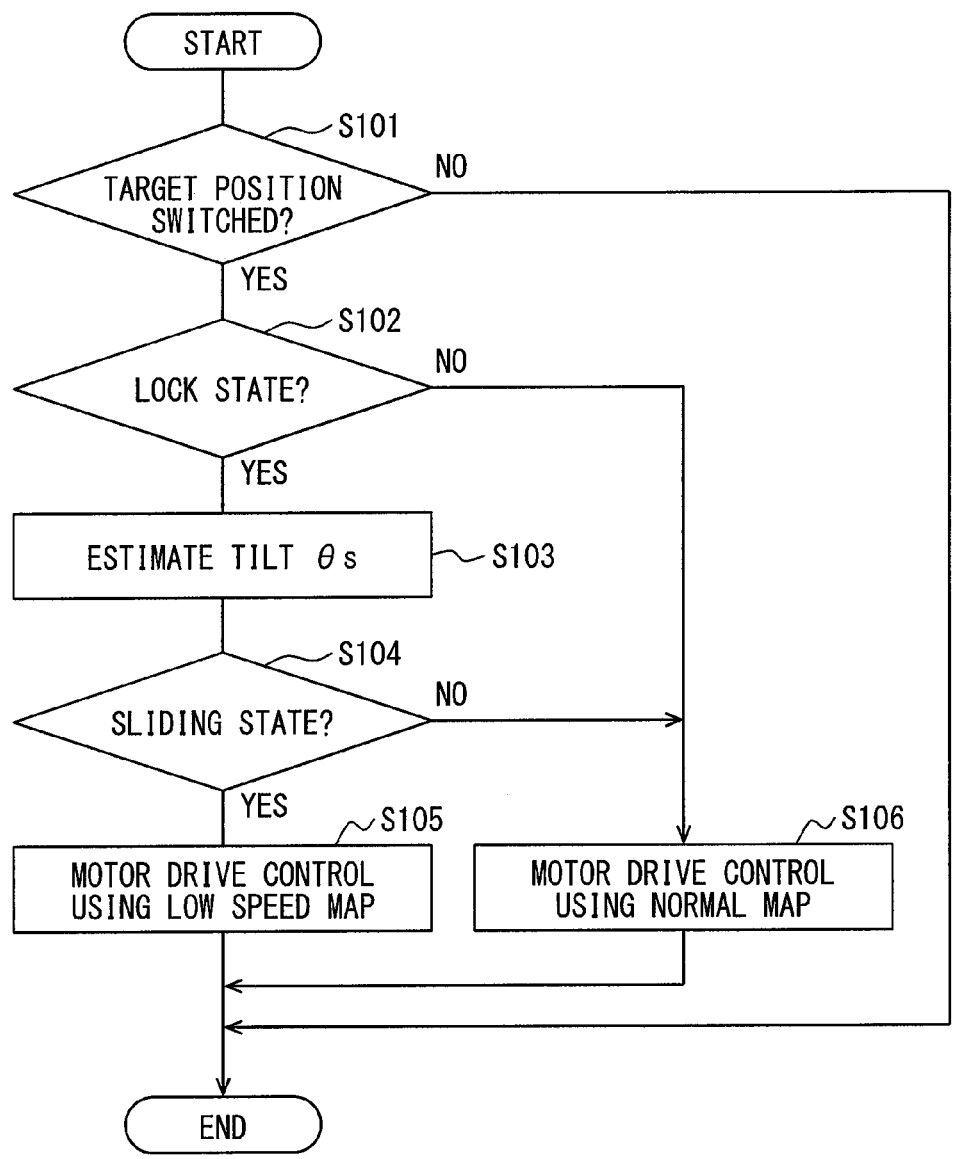
FIG. 4 is a flowchart of a motor speed selection control process in the one embodiment of the present disclosure.

A motor speed selection control by the present embodiment is described based on a flowchart in FIG. 4.

When the shift-by-wire system 1 is started, the motor speed selection control is performed at the predetermined intervals with the controller 60 after the initial drive control and the reference position learning control.

In step S101 (hereafter, a "step" is omitted and is represented by an upper case sign "S"), it is determined whether the target range is switched by a gearshift operation by the driver. When it is determined that the target range is not switched (S101:NO), processing after S102 is not performed. When it is determined that the target range is switched (S101:YES), the process proceeds to S102.

In S102, it is determined whether the park lock mechanism 50 is in the lock state. The determination in this step is that, if a shift range is determined as the P range, it is determined that the park lock mechanism 50 is in the lock state, and if it is in the non-P range, it is determined that the mechanism is in the unlock state. The shift range may be detected based on an output signal of the range sensing device which is not illustrated, or may also be detected based on the encoder count Ne when no range sensing device is provided. When the park lock mechanism 50 is determined to be in the unlock state (S102:NO), the process proceeds to S106. When the park lock mechanism 50 is determined to be in the lock state (S102:YES), the process proceeds to S103.

In S103, a tilt angle of the vehicle 90 is estimated as θs. The tilt angle θs may be, for example, estimated by using a G sensor of an ESC (i.e., Electronic Stability Control, anti-skid brake system), or by using a vehicle tilt angle sensor for a theft prevention, (i.e., from the detection value of those sensors). Further, the tilt angle θs may also be estimated based on a current position information from a navigation device (not illustrated) and a geographical information of the current position, and by employing a tilt estimation logic for such data. In the present embodiment, the tilt angle θs takes a positive value when the vehicle tilts backward (i.e., on a backward descending slope), takes a 0 zero value when the vehicle is on a level surface, and takes a negative value when the vehicle tilts forward (i.e., on a forward descending slope).

In S104, based on the tilt angle θs, it is determined whether the vehicle 90 is in a sliding state. In the present embodiment, when the tilt angle θs is either smaller than a negative determination threshold θ1 or is greater than a positive determination threshold θ2, it is determined that the vehicle 90 is in a sliding state. The negative determination threshold θ1 is a negative value, and the positive determination threshold θ2 is a positive value. The absolute value of the positive determination threshold θ2 may be the same value as the absolute value of the negative determination threshold θ1, or they may be different from each other.

The negative determination threshold θ1 and the positive determination threshold θ2 are respectively set to a value that may possibly cause a gear noise from the park lock mechanism 50 at a lock release time, based on the weight of the vehicle 90 or the like. When it is determined that the vehicle 90 is not in the sliding state (i.e., when θ1≤θs≤θ2) (S104:NO), the process proceeds to S106. When it is determined that the vehicle 90 is in the sliding state (i.e., when θs<θ1, or θ2<θs) (S104:YES), the process proceeds to S105.

In S105, the drive of the motor 11 is controlled by using a low speed map of a parking lock release control.

In S106, the drive of the motor 11 is controlled by using a normal shift switching map.

Here, the drive control of the motor 11 is described by using an example in which the shift is switched from P range to D range.

In the present embodiment, a power supply determination value M is calculated based on the encoder count Ne, and, with reference to a preset conversion table or the like, the power supply phase is determined based on the power supply determination value M. When the motor 11 is rotated forward, the determination value M is calculated by the following formulae (1), and when the motor 11 is rotated reversely, the determination value M is calculated by the following formula (2).

$$M = Ne - G + K1 + Ks \quad (1)$$

$$M = Ne - G - K2 - Ks \quad (2)$$

The signs in the above formula are as follows.
M: Power supply phase determination value
Ne: Encoder count value
G: Initial position error learned value
K1: Forward rotation phase advance amount
K2: Reverse rotation phase advance amount
Ks: Phase advance correction amount The forward rotation phase advance amount K1 is an advance amount of the power supply phase for the forward rotation of the motor 11, and, may be set to, for example, K1=4.

The reverse rotation phase advance amount K2 is an advance amount of the power supply phase for the reverse rotation of the motor 11, and, may be set to, for example, K2=3.

The phase advance correction amount Ks is calculated on a map that is made up from (i) the rotation number Nm of the motor 11 and (ii) a target difference ΔC derived from subtracting the current encoder count from the target encoder count of the encoder 12.

When the motor 11 is rotated forward, the phase advance correction amount Ks equal to "−1" is used to keep the current rotation number, together with a greater than "−1" amount used for the acceleration and a smaller than "−1" amount used for the deceleration. In the present embodiment, the rotation number of the motor 11 may be considered as the rotation speed of the motor 11.

Figure 5A:
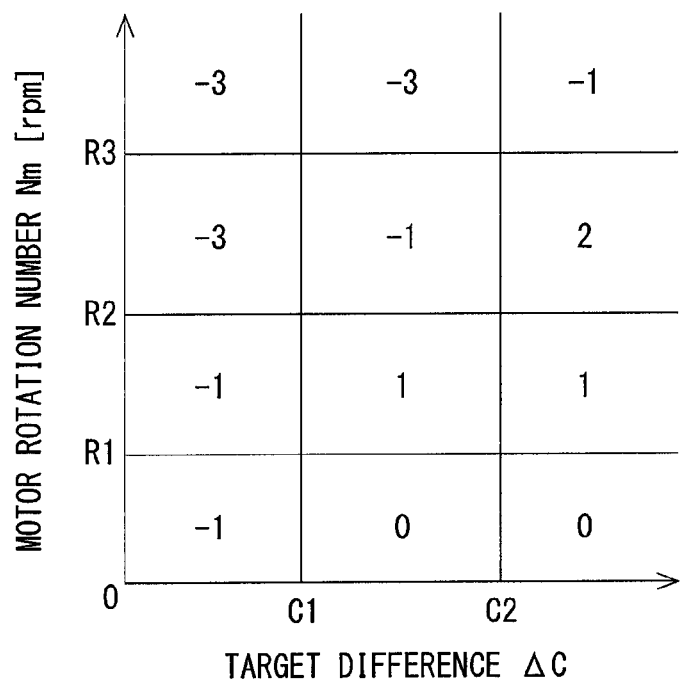
FIGS. 5A/B are illustrations of a phase advance correction map in the one embodiment of the present disclosure.

In the present embodiment, at a normal operation time, the phase advance correction amount Ks is calculated by using a normal shift switching map (i.e., a normal map) shown in FIG. 5A. In the shift switching map, a region where the target difference ΔC takes a large value, the motor 11 receives an acceleration control. Specifically, in the present embodiment, a region where the target difference ΔC is greater than a difference threshold C2 is designated as an "acceleration region." Further, when the target difference ΔC is small and the motor rotation number Nm is large, the motor 11 receives a deceleration control for preventing an overshoot.

Figure 5B:
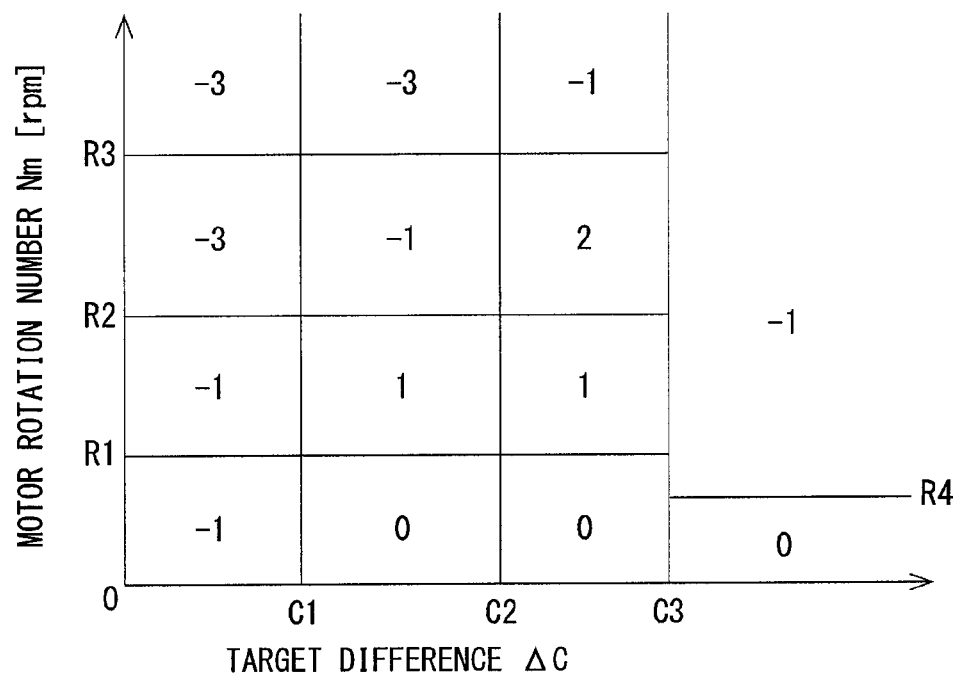

Further, at the lock release time, if the vehicle 90 is in a sliding state, e.g., in a backward sliding state, the phase advance correction amount Ks is calculated by using a low speed map of the parking lock release control in FIG. 5B. The low speed map in FIG. 5B has a "low speed region" which is a region where the target difference ΔC is greater than a difference threshold C3.

The difference threshold C3 is set to a count that corresponds to an angle between a P lock position (i.e., P LOCK POS in FIG. 6) and a P lock release position (i.e., P LOCK RELEASE POS in FIG. 6). When an angle between the P lock position and a target range (i.e., D range in this case) is designated an angle θa and an angle between the P lock position and the P lock release position is designated as an angle θb, the difference threshold C3 is set to the count corresponding to the value θa−θb.

FIG. 5B is further used to describe the low speed region. That is, in the low speed region, in which the target difference ΔC is greater than the difference threshold C3, the phase advance correction amount Ks is set to a certain value so that the torque causing a force in an engagement of the park lock mechanism 50 is eased and released in a backward sliding situation when the lock is released.

In the present embodiment, in the low speed region, the phase advance correction amount Ks is set to a value "0" when the motor rotation number Nm is smaller than a rotation number threshold R4, and the phase advance correction amount Ks is set to a value "−1" when the motor rotation number Nm is equal to or greater than R4. The rotation number threshold R4 corresponds to, for example, a switching speed at the time of manual shift switching operation, i.e., 1.5 seconds when the gear is shifted from P range to D range by a manual shifting of the shift lever. The number R4 is thus actually a 300 (rpm) or the like.

In other words, the number of rotations of the motor 11 is controlled in the present embodiment to be less than the number R4 when the detent plate 32 moves from the P lock position to the P lock release position.

Further, threshold values C1 to C4 concerning the target difference ΔC in FIGS. 5A/B, the threshold values R1 to R4 concerning the motor rotation number Nm, and the phase advance correction amount Ks may respectively changeable according to the characteristics of the motor 11, or according to a shape and a target range of the detent plate 32, etc.

Figure 7:
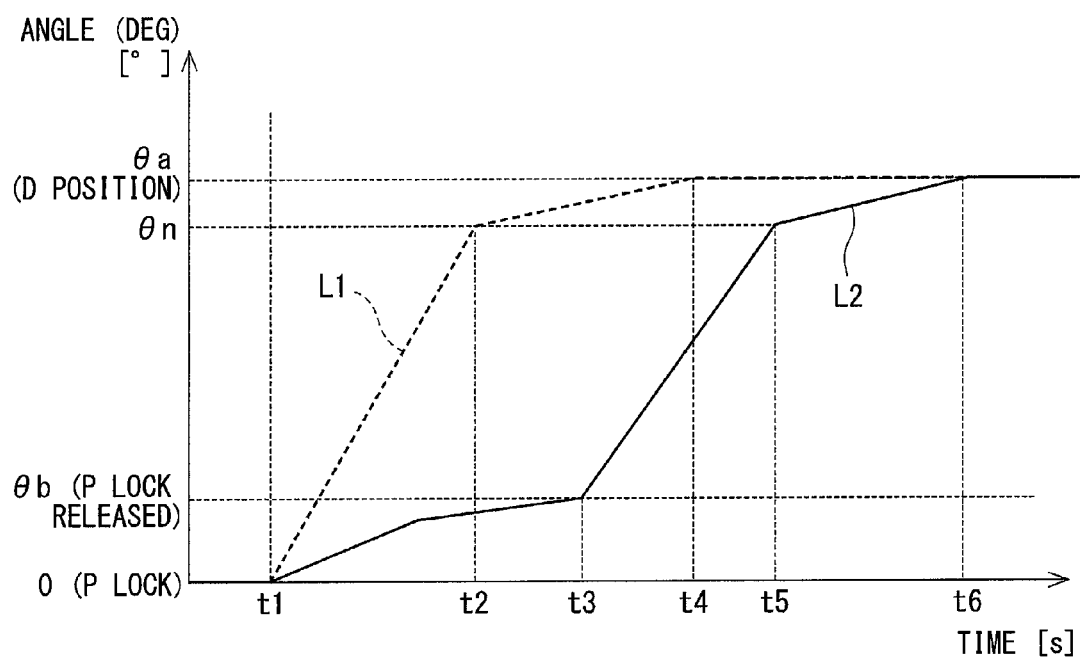
FIG. 7 is a diagram of how a shift position switching map affects an angle of a shift position switching along time.

In FIG. 7, a time diagram including two shift position switching maps is shown, for describing a difference of the motor rotation angles, i.e., showing how different maps switch angles differently.

In FIG. 7, a horizontal axis represents time [s] (seconds), and a vertical axis represents angle [DEG] (degrees), which thus describes a relationship between a rotation position of the detent plate 32 with reference to the P lock position of 0 degrees and a time of switching the shift range.

As shown in a dashed line L1, when the motor 11 is driven by using the normal map for the switching of the shift range, the motor 11 is driven at high speed from time t1 to time t2, (i.e., from a switching operation start time t1 to an overshoot suspected time t2 at which the rotation angle approaches to an angle θn that is close to an angle of D range). Therefore, in case that the vehicle 90 is tilted, a gear noise may possibly be generated at the lock release timing.

In the present embodiment, in case that the vehicle 90 is in the backward sliding state, as shown in a solid line L2 in FIG. 7, a low speed map is used for driving the motor 11 at low speed in a period from time t1 to time t3, (i.e., from the switching operation start time t1 to a lock release time t3 at which the rotation angle reaches the P lock release position). That is, the motor 11 is driven at lower speed during such a period in comparison to the normal map, thereby releasing the parking lock without generating the gear noise. Then, the motor 11 is driven at high speed after the lock release time t3 to time t5 at which the angle reaches θn, and is driven at a reduced speed again for preventing an overshoot after time t5.

As described in full details above, the controller 60 of the present embodiment controls the motor 11 which drives and rotates the detent plate 32, for the switching between the lock state and the unlock state of the park lock mechanism 50 according to the operation position of the plate 32. The controller 60 executes the following processing.

That is, the controller 60 estimates a tilt state of the vehicle 90 (S103 in FIG. 4), and detects the lock state of the park lock mechanism 50 (S102).

Then, the controller 60 changes the rotation speed of the motor 11 according to the tilt state, when changing the operation position of the detent plate 32 and switching the park lock mechanism 50 from the lock state to the unlock state (S105).

In such manner, the target rotation speed of the motor 11 is changeable according to the tilt state of the vehicle 90, i.e., according to the tilt state that changes the engagement of the gears in the park lock mechanism 50. In other words, the lock release operation for releasing the lock state of the park lock mechanism 50 may be performed at an appropriate speed, thereby reducing the gear noise at the lock release time.

Specifically, the controller 60 rotates the motor 11 at a lower target rotation speed when the vehicle 90 is in the backward sliding state than the speed when the vehicle 90 is in the level state. The vehicle 90 in the backward sliding state has a backward sliding torque in the park lock mechanism 50 which causes a strong engagement and locking of the gears in the park lock mechanism 50 in comparison to the level state. Thus, by reducing the motor rotation speed, the locking force in the park lock mechanism 50 is eased and released when the lock state of the park lock mechanism 50 is released. Therefore, the gear noise at the lock release time is reduced and the driver's comfort is improved.

The motor 11 of the present embodiment is a switched-reluctance motor, and the power supply phase of the motor 11 is orderly switched based on the encoder count, i.e., the output signal from the encoder 12 that outputs the pulse signals in sync with the rotation of the rotor of the motor 11.

The controller 60 variably changes the phase advance amount of the power supply phase relative to the rotation phase of the rotor according to the tilt state of the vehicle 90. In the present embodiment, the target rotational speed is variably changed, based on the variable change of the phase advance amount, i.e., based on the changing of the phase advance correction amount Ks, according to the tilt state of the vehicle 90.

In the present embodiment, changing the phase advance correction amount Ks is equivalent to "adjusting a target rotation speed of the motor" and reducing the phase advance correction amount Ks to have a smaller value is equivalent to "adjusting the target rotation speed of the motor to be smaller" in the claims. Thereby, according to the tilt state of the vehicle 90, the target rotational speed of the motor 11, i.e., the SR motor, is switched appropriately.

The controller 60 of the present embodiment is applied to the shift-by-wire system 1. The shift-by-wire system 1 is provided with the controller 60, the motor 11, the shift position switcher 30, and the park lock mechanism 50. As for the motor 11, a drive thereof is controlled by the controller 60. The shift position switcher 30 has the detent plate 32 for the switching of the shift range by using a driving power of the motor 11. The park lock mechanism 50 is put in the lock state when the shift range is in the P range, and is put in the unlock state when the shift range is in any range other than the P range.

In the present embodiment, the switching of the shift range is realized as a by-wire system which is controlled by the controller 60, enabling a quick switching of the shift range, quicker than the manual shifting operation. Further, when the vehicle 90 is in the tilt state, the strong engagement of the gears in the park lock mechanism 50 due to the backward sliding torque from an axle shaft is appropriately released by devising a variably-changeable target rotation speed of the motor 11, which is changed and adjusted according to the tile state of the vehicle 90, thereby reducing the gear noise at the lock release time, i.e., when the shift range is switched from the P range to the other range.

In the present embodiment, the controller 60 constitutes a "tilt estimation unit", a "lock detector", and a "target rotational speed adjustor" in the claims. Further, S103 in FIG. 4 is equivalent to processing of a function of the "tilt estimation unit", S102 is equivalent to processing of a function of the "lock detector", and S105 and S106 are equivalent to processing of a function of the "target rotational speed adjustor."

Other Embodiments (a) Motor

The motor of the above-mentioned embodiment is an SR motor.

In other embodiments, the motor may also be a synchronous motor of a brush-less type other than the SR motor.

Further, in other embodiments, two or more motors and motor drivers may be provided, and a control object may be driven in two or more systems.

In the above-mentioned embodiment, the motor drive control is performed based on (i) calculating the target difference as a difference between the target encoder count and the current encoder count and (ii) calculating the power supply phase determination value derived from the target difference.

In other embodiments, the target difference may be not the encoder count but a value that corresponds to a difference between the target rotation position and the current position of the motor, e.g., a motor rotation angle or the like. Further, in other embodiments, the motor control method may be any method other than a method using the power supply phase determination value.

In the above-mentioned embodiment, in case that the vehicle is in a backward sliding state, a different map, i.e., a low speed map, that is different from a normal map is used for the motor drive control, for changing the correction amount of the phase advance amount and for variably changing the motor rotation speed.

In other embodiments, the target rotational speed may be calculated by using a map, a formula, etc., for example, according to a tilt angle of the vehicle, or by any method other than the above according to the tilt state of the vehicle.

(b) Encoder

In the above-mentioned embodiment, the encoder which detects a relative rotation position of the motor is described as a magnetic type encoder.

In other embodiments, the encoder may be an optical type, or a brush type, or any other type.

In the above-mentioned embodiment, the encoder outputs the pulse signal of the A phase and the B phase.

In other embodiments, the encoder may output, in addition to outputting the A/B phase pulse signal, a Z phase pulse signal for the correction (i.e., for the indexing). Further, the encoder may be replaced with a rotation angle sensor or the like.

(c) Shift Position Switcher

The number of the concavities on the detent plate of the shift range switcher in the above-mentioned embodiment is four.

In other embodiments, the number of concavities may be any number, four or other numbers, i.e., not limited to a certain number or to a number range.

In the above-mentioned embodiment, the "detent mechanism" is described as having multiple concavities on the detent plate that is disposed on the manual shaft and the detent roller.

In other embodiments, the "detent mechanism" having multiple concavities and the detent roller may be disposed at other positions, e.g., at a position in the actuator. Further, as long as the detent mechanism can appropriately hold the rotation position of the control object at a fixed position, the detent mechanism may have any configuration other than having the concavities and the detent roller. That is, in other words, the control object may be any device other than the detent plate as long as it is switchable between the lock state and the unlock state.

(d) Lock Mechanism

In the above-mentioned embodiment, the lock mechanism is put in the lock state when the parking lock pole and the parking gear in the parking lock mechanism engage, and is put in the unlock state when such an engagement is released.

In other embodiments, the lock mechanism may take any configuration as long as having switchability between the lock state and the unlock state, according to the change of the operation position of the control object.

(e) Shift-by-Wire System

The shift-by-wire system may be applicable to the other system, i.e., to a continuously-variable transmission (CVT) having four positions of P range, R range, N range and D range, or to the automatic transmission of the hybrid vehicle, just like the manner described above. Further, the shift-by-wire system is applicable to two range switching (i.e., switching between P range and non-P range) of the parking mechanism in the electric vehicle, or the hybrid vehicle.

In the above-mentioned embodiment, the controller is applied to a shift-by-wire system. In other embodiments, the controller may be applicable to any switching device that switches an operation position by using a drive power of the motor.

Although the present disclosure has been described in connection with preferred embodiment thereof with reference to the accompanying figures, it is to be noted that various changes and modifications will become apparent to those skilled in the art, and such changes, modifications, and summarized schemes are to be understood as being within the scope of the present disclosure as defined by appended claims.

What is claimed is:

1. A controller, comprising:
   a motor driver; and
   a microcomputer connected to the motor driver to control a motor that drives a controlled object that has a park lock mechanism having a lock state and an unlock state,
   wherein the lock state and the unlock state are switched according to an operation position of the controlled object, wherein
   the controller is configured to:
      determine whether the lock mechanism is in the lock state or in the unlock state; and
      adjust a target rotation speed of the motor according to an estimated tilt of a vehicle when the operation position of the controlled object is changed for switching the lock state to the unlock state, wherein
   the controller is configured to adjust a target rotation speed of the motor when the vehicle is in a sliding state to be smaller than a target rotation speed of the motor when the vehicle is in a level state.

2. The controller of claim 1, wherein
   the motor comprises a switched-reluctance motor in which a power supply phase is switched according to a count value of an output signal pulse from an encoder, the output signal pulse corresponding to a rotation of a rotor of the motor, and
   the controller variably adjusts a phase advance amount of the power supply phase relative to a rotation phase of the rotor according to the tilt of the vehicle.

3. A shift-by-wire system comprising:
   a controller, comprising:
      a motor driver; and
      a microcomputer connected to the motor driver to control a motor that drives a controlled object that has a park lock mechanism having a lock state and an unlock state,
   wherein the lock state and the unlock state are switched according to an operation position of the controlled object, wherein
   the controller is configured to:
      determine whether the lock mechanism is in the lock state or in the unlock state; and
      adjust a target rotation speed of the motor according to an estimated tilt of a vehicle when the operation position of the controlled object is changed for switching the lock state to the unlock state;

a shift position switcher switching a shift position of a controlled object based on a drive of the controlled object by using the motor; and a park lock mechanism taking a lock state when the shift position is in a park position and an unlock state when the shift position is in a position other than the park position, wherein the controller is configured to adjust a target rotation speed of the motor when the vehicle is in a sliding state to be smaller than a target rotation speed of the motor when the vehicle is in a level state.

* * * * *